United States Patent [19]
Haas et al.

[11] 3,906,072
[45] Sept. 16, 1975

[54] MOLDING PROCESS

[75] Inventors: Thomas W. Haas, Watchung; Richard L. Mach, Milford; Edward Studley, North Plainfield; Robert Hoffman, Clark, all of N.J.

[73] Assignee: American Standard, Inc., New York, N.Y.

[22] Filed: Oct. 1, 1973

[21] Appl. No.: 402,214

Related U.S. Application Data
[63] Continuation of Ser. No. 187,381, Oct. 7, 1971, abandoned.

[52] U.S. Cl. .......... 264/322; 264/325; 264/DIG. 66
[51] Int. Cl. ............................................. B29g 1/00
[58] Field of Search .......... 264/245, 246, 247, 319, 264/320, 322, 325, 268, DIG. 66; 425/264

[56] References Cited
UNITED STATES PATENTS

| | | | |
|---|---|---|---|
| 2,874,419 | 2/1959 | May et al. | 264/135 X |
| 3,597,425 | 8/1971 | Schaines | 264/255 X |
| 3,766,186 | 10/1973 | Mach et al. | 264/325 X |

Primary Examiner—Robert F. White
Assistant Examiner—Thomas P. Pavelko
Attorney, Agent, or Firm—James J. Salerno, Jr.; Robert G. Crooks

[57] ABSTRACT

A method of compression molding sanitary ware from thermosetting resins such as melamine. The mold is configured to a minimum draft angle for the most steeply sloped wall, and the resin is charged into the mold in the form of one or more thickened cakes of agglomerated resin particles. The mold configuration and method of charging are such that the steeply sloped mold surfaces achieve a relatively high pressure on the plastic so as to minimize surface porosity. During closing movement of the mold the cake of resin is broken and caused to flow upwardly to form a integral deck portion as well as flow downwardly against the steeply sloped surface of the recieving mold.

1 Claim, 8 Drawing Figures

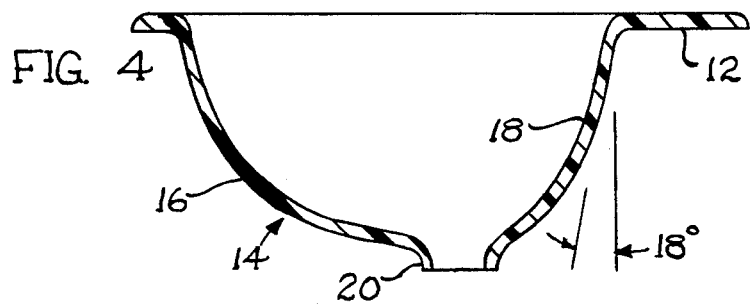
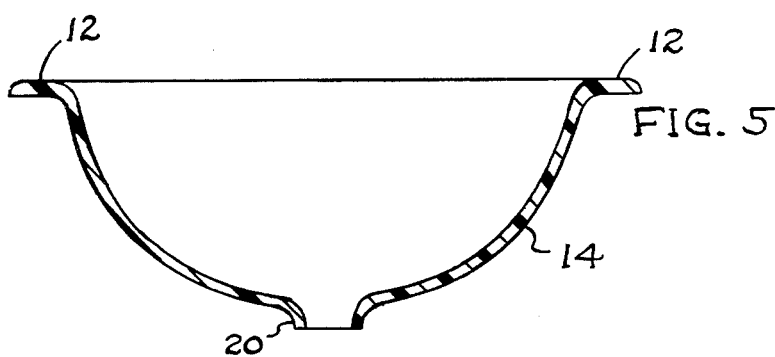
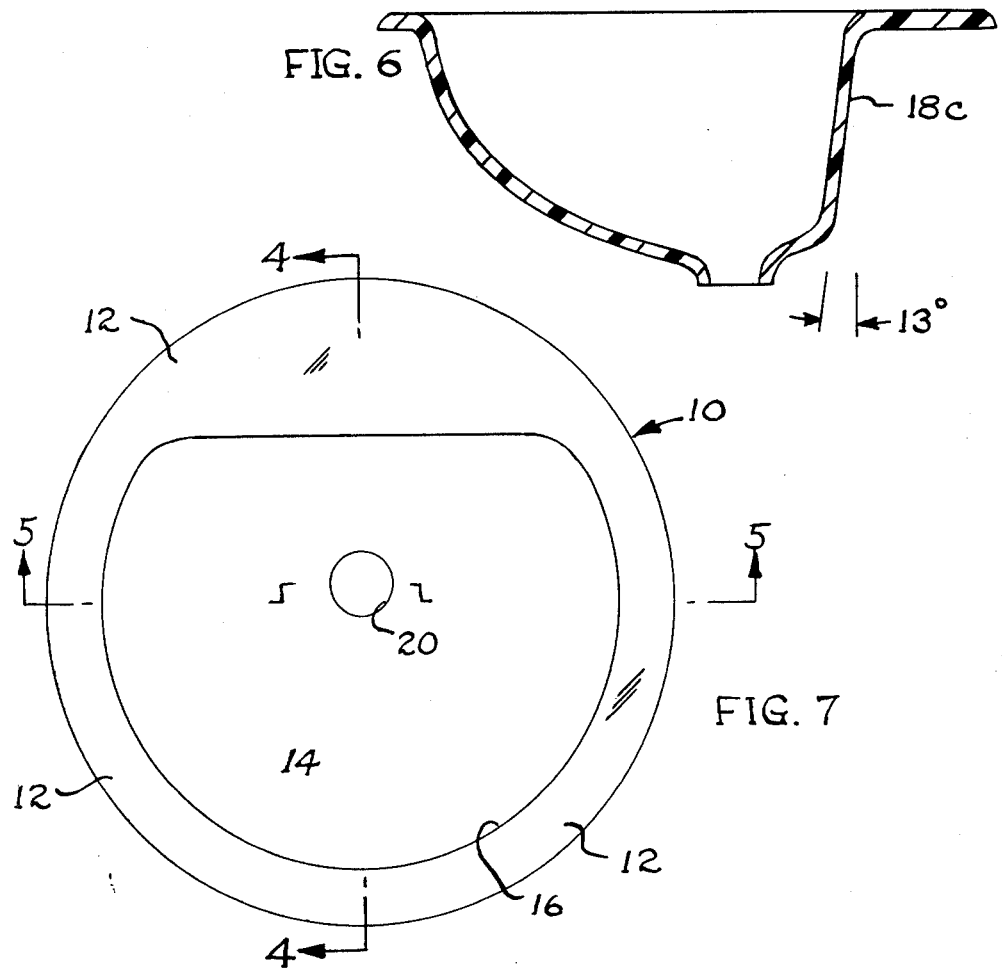

MOLDING PROCESS

This is a continuation of application Ser. No. 187,381, filed Oct. 7, 1971 now abandoned.

BACKGROUND OF THE INVENTION

Prior to this invention it was proposed to compression mold lavatories from thermosetting resins such as melamine or phenol formaldehyde. It was found however that the resin for the most steeply sloped wall sections tended to have minute porosity therein which collected dirt and stains. It was necessary under conventional practice to provide a glaze coating on the formed lavatory to cover up the porous areas of the article.

Applicants have found that a sufficiently non-porous article can be formed in a one-step compression molding operation if the mold surfaces for the most steeply sloped wall are given draft angles of approximately 18° or more. Also applicants have found that it is preferable to charge the thermosetting resin into the mold in the form of a thickened cake of agglomerated resin particles; the resin cake is placed in a nearly upright position leaning against the most steeply sloped wall surfaces of the mold.

When the compression molding operation is carried out in the prescribed manner the formed article is found to have no porosity or at least no porosity as would collect dirt or stain from chemicals, etc.

THE DRAWINGS

FIGS. 1, 2 and 3 are cross-sectional views taken through a compression molding apparatus that can be used in the practice of this invention, the various figures being taken at different stages in the mold closure sequence;

FIGS. 4 and 5 are cross-sectional views on lines 4—4 and 5—5 in FIG. 7;

FIG. 6 is the sectional view in the same direction as FIG. 4 but taken through an article formed according to the prior art;

FIG. 7 is a top plan view of a lavatory formed under this invention;

Figure 1:
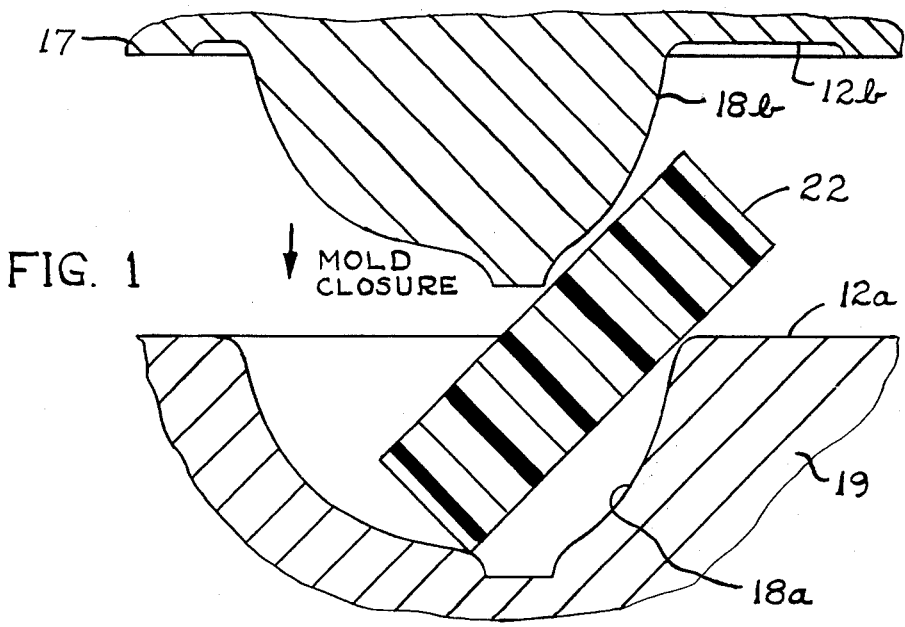

FIGS. 4, 5, and 7 illustrate the general features of a lavatory formed from thermosetting resin by practice of this invention. The lavatory comprises a one-piece thermoset molding 10 having a peripheral deck section 12 and a central bowl section 14 depending from the deck section. The front wall of the bowl section, designated by numeral 16 in FIG. 4, is slightly or shallowly sloped, while the rear wall of the bowl section, designated by numeral 18 in FIG. 4, is much more steeply sloped. Wall 18 preferably has a draft angle of at least about 18° as measured in FIG. 4. The bottom wall section of the molding is formed into a collar 20 which defines the drain opening for the lavatory.

Figure 2:
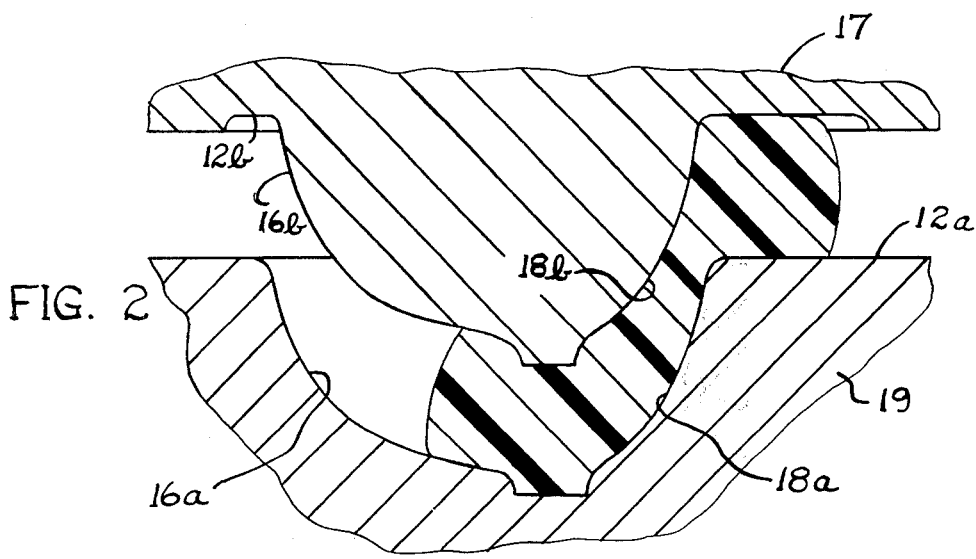
Figure 3:
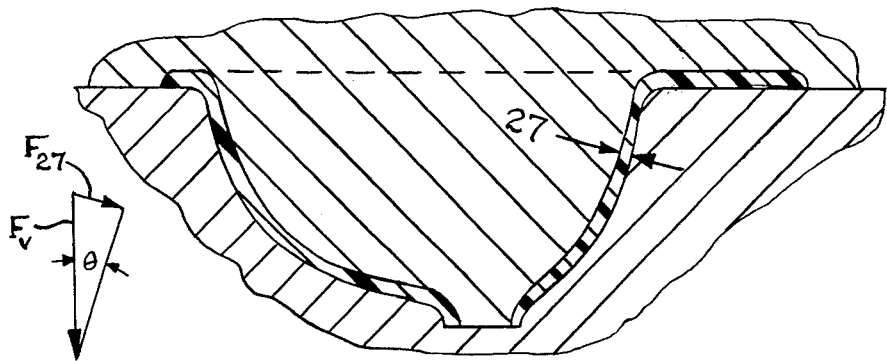

The molded article of FIGS. 4, 5 and 7 may be formed by a compression-molding operation, using heated mold members of the general configuration shown in FIGS. 1 through 3. The molding operation involves heating of the mold members to about 300° F., placement of the resin charge into the mold cavity, closure of the upper mold member 17 onto the lower mold member 19, and retention of the mold members in the closed position for a predetermined time period, for example 2 to 4 minutes.

During the mold closure stroke the resin is mechanically compacted and forced into the various cavity spaces. Thereafter the heated mold surfaces effect fusion of the resin and thence polymerization. During the polymerization or cure period water of condensation is evolved from the mold cavity in the form of vapor. In some instances the mold cavity members may be momentarily separated from one another within a few seconds after mold closure in order to release the vapor. At completion of the polymerization (cure) period the formed article is a rigid solid molding.

The thermosetting resin, for example melamine is preferably initially charged into the mold cavity in the form of a single cake of agglomerated resin particles 22. The resin cake is placed in a nearly upright position leaning against the mold casing surface 18a which forms the outer face of the steeply sloped resin wall 18 (FIG. 4). Accordingly, as the upper mold member is moved downward from the FIG. 1 position to the FIG. 2 position the steeply sloped mold surface 18b exerts a compacting action on the resin cake. A portion of the resin block probably softens or liquifies and then flows out onto the deck-forming surface 12a of the lower mold member.

As the heated mold member 17 continues its descent from the FIG. 2 position to the FIG. 3 position some of the resin is mechanically forced outwardly along the less steeply sloped mold surfaces 16a and 16b to fill out the bowl section of the mold casing. The major part of the deck is believed to be formed by the upper end area of the resin cake that had been broken away from the cake when the mold member 17 had reached the position shown in FIG. 2.

PREHEATED PREFORMED

The resin cake 22 preferably is formed from cellulose-filled melamine molding power or granules. In one instance the cake had a dimension of 4 × 6 × 12 inches and a weight of about 5 pounds; it was formed by dielectrically heating a contained mass of resin granules to partial fusion at a temperature of about 200° F. The heated porous cake was then charged into the mold cavity. FIG. 1 illustrates two dimensions of the cake, namely the 4 inch dimension and the 12 inch dimension. The cake has its 6 inch dimension extending into the plane of the paper, i.e. the cake is positioned on the front-to-rear centerline of the mold cavity (line 4—4 in FIG. 7).

The preheating of the cake achieves the conventional advantages, namely a shortening of the cure cycle and a greater uniformity in the molded article (more even heating). Under conventional practice powders or granules would be compressed into dense preforms outside the mold cavity. A number of such preforms would then be heated and then charged into the mold cavity. We have found that when the powders or granules are agglomerated into a cake of the described dimensions and orientation shown in FIG. 1 there is no necessity or advantage in precompressing the resin cake or in sectionalizing the charge into multiple preforms. A single resin cake of agglomerated granules forms a suitable charge.

FILLER

We have found satisfactory products using melamine molding powders compounded with a filler of alpha cellulose. It is believed that the material we used had the filler incorporated into the molding powders by conventional methods, such as by adding the filler to the resin syrup, drying, cutting, grinding and compounding with finely divided pigments.

The filler apparently achieves the conventional advantages, namely to control the viscosity of the fused resin (and hence its flowability), and to provide rigidity or reinforcement in the finished article. It is theorized that our invention could be practised without fillers. In our work to date we have used molding powders containing about 30% filler.

ELIMINATION OF POROSITY

Articles formed to the FIG. 4 configuration (FIGS. 1–3 method) were found to have substantially no surface porosity which would contribute toward dirt collection, staining or chemical attack. In contrast, compression-molded articles formed to the configuration of FIG. 6 were found to have an undesirable surface porosity in the steeply sloping wall 18c.

Essentially the only difference between the satisfactory article of FIG. 4 and the unsatisfactory article of FIG. 6 was the different slope or draft of the two walls 18 and 18c. In one case the wall had a draft angle of approximately 18°, while in the other case the wall had a draft angle of only 13°. It is theorized that the more steeply sloped wall of the formed lavatory (FIG. 6) was not fully compacted during mold closure (FIG. 2 stage) because the upper mold member was not able to apply a sufficient lateral force on the resin.

In the case of the FIG. 4 article the mold surface 18b apparently exerts enough lateral (horizontal) force on the resin during its downward movement to achieve a satisfactory resin densification, whereas in the case of the FIG. 6 article there is insufficient lateral squeezing force imposed on the resin.

In our experimental work we employ mold closure forces on the order of 4000 p.s.i. However such forces are exerted in vertical directions, and the effective force components normal to the resin wall sections (numeral 27 in FIG. 3) are considerably less than this value. Numerically the effective force component works out to be the vertical force F multiplied by the sine of angle $\theta$, where $\theta$ is the draft angle of the most steeply sloped wall. We apparently achieve sufficient compaction (FIGS. 1–3) because of the relatively large draft angle for the steeply sloped wall. When a small draft angle is employed it is apparently not possible to produce sufficient resin densification.

FIG. 8

Figure 8:
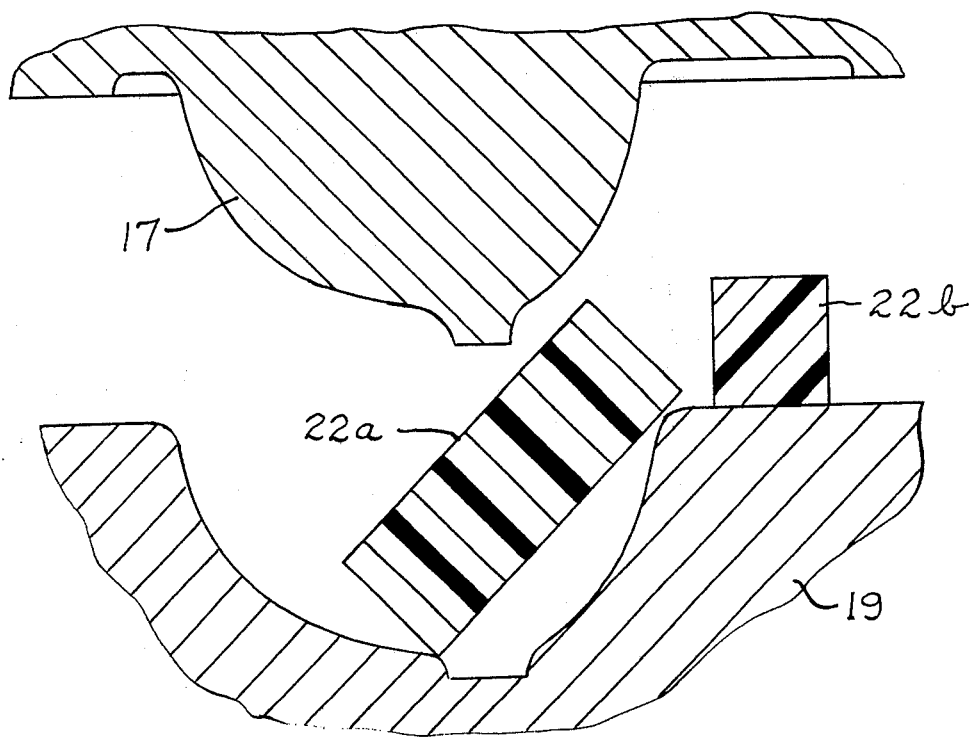
FIG. 8 is a view similar to FIG. 1 illustrating a second manner of charging the mold cavity using the method of this invention.

We have found that it is not necessary to agglomerate the resin charge into a single resin cake. A satisfactory article can be formed using a multiple cake charge as shown in FIG. 8. When working with multiple cake charges we used the same total cake volume and same general molding procedure as previously described. The essentail steps are apparently to use a mold draft angle not less than 18 degrees, and to stand the major cake component against the most steeply sloped mold wall where it can be acted upon by the mold closure forces. Our experience with multiple cake charges (FIG. 8) indicates that multiple molten streams (from different cakes) can blend and knit together into a nonporous surface provided sufficient effective pressure is applied (by using a sufficient mold draft angle).

The drawings illustrate the improved compression-molding operation applied to the production of a lavatory, but it is believed that the invention may be useful in production of other items of sanitary ware such as bath tubs, toilet bowls, and toilet tanks. We have thus far confined our experimental work to melamine molding materials, but it is believed that other thermosetting materials such as urea resins, and phenol formalehyde resins might also be used.

We claim:

1. A single stroke compression molding process adapted for the production of a nonporous plumbing fixture, such as a lavatory having a deep dished bowl section and a connecting peripheral deck section, the deep dished bowl section having a steep wall forming an acute angle of about 18° with the vertical plane, the compression mold having two segments a charge-receiving mold segment and a coacting mating mold segment, the process consisting essentially of:

charging the receiving mold segment with a single flattened cake-like mass of thermosetting resin consisting of porous cellulose filled melamine molding powder in the form of a cake which is preheated to a temperature of about 200°F by positioning the cake on its lower edge near the center and bottom of the receiving mold segment and its opposite upper edge extending substantially above the receiving mold segment, the cake portion inclined to a wall of the receiving mold segment and forming the steep wall of the dished bowl section while the portion of the mass projecting above the receiving mold segment serving as the charge for the deck section;

closing the mold by moving the co-acting mating mold segment into the charge-receiving mold segment and subjecting the mass of thermosetting resin to pressure of about 4,000 p.s.i. and heat at a temperature of about 300° F so that the portion of the mass lying within the charge-receiving mold segment is forced to flow downwardly against the steeply sloped surface of the receiving mold segment and the portion of the charge projecting above the receiving mold segment is forced to flow upwardly and to break away against the deck forming surface of the receiving mold segment to form the major part of the deck; and, heating and maintaining the mold segments at a temperature of about 300° F for a period of time from about 2 to about 4 minutes and pressure of about 4,000 p.s.i. whereby a nonporous plumbing fixture is formed in a single compression step.

\* \* \* \* \*